(12) United States Patent
Levine et al.

(10) Patent No.: US 9,804,807 B2
(45) Date of Patent: Oct. 31, 2017

(54) METHOD AND SYSTEM FOR AUTOMATED HARDCOPY CHANGE NOTIFICATION

(75) Inventors: Jonathan D Levine, Rochester, NY (US); Neelima Gokhale, Rochester, NY (US); Stanton G Pecor, Fairport, NY (US)

(73) Assignee: XEROX CORPORATION, Norwalk, CT (US)

( * ) Notice: Subject to any disclaimer, the term of this patent is extended or adjusted under 35 U.S.C. 154(b) by 519 days.

(21) Appl. No.: 13/572,788

(22) Filed: Aug. 13, 2012

(65) Prior Publication Data

US 2014/0043646 A1 Feb. 13, 2014

(51) Int. Cl.
*G06F 3/12* (2006.01)
*G06F 17/30* (2006.01)

(52) U.S. Cl.
CPC .......... *G06F 3/1207* (2013.01); *G06F 3/1273* (2013.01); *G06F 3/1288* (2013.01); *G06F 17/30088* (2013.01)

(58) Field of Classification Search
None
See application file for complete search history.

(56) References Cited

U.S. PATENT DOCUMENTS

| | | | |
|---|---|---|---|
| 5,983,268 A | 11/1999 | Freivald et al. | |
| 7,047,487 B1* | 5/2006 | Bates | G06F 17/2247 715/234 |
| 8,508,755 B2* | 8/2013 | Ding | G06F 3/1288 358/1.13 |
| 2006/0209351 A1* | 9/2006 | Saito | H04N 1/00846 358/3.28 |
| 2007/0165266 A1* | 7/2007 | Tian | G06F 3/1212 358/1.15 |
| 2007/0177186 A1* | 8/2007 | Kishimoto | G06F 3/1204 358/1.14 |
| 2007/0177824 A1* | 8/2007 | Cattrone | G06F 17/30011 382/306 |
| 2008/0080017 A1* | 4/2008 | Ishizuka | G06F 17/2288 358/452 |
| 2009/0228489 A1* | 9/2009 | Hirai | G06F 21/608 |
| 2009/0307678 A1* | 12/2009 | Wu | G06F 8/65 717/168 |
| 2010/0097661 A1* | 4/2010 | Hoblit | H04N 1/32133 358/405 |
| 2011/0161425 A1* | 6/2011 | Xiao | G06F 17/30368 709/206 |
| 2012/0011216 A1* | 1/2012 | Zuber | G06F 17/30011 709/206 |
| 2012/0194848 A1* | 8/2012 | Hirai | G06F 21/608 358/1.14 |

OTHER PUBLICATIONS

"Receive Change Notification for a Single File in a Document Library," Microsoft Technet, http://technet.microsoft.com/en-us/library/cc751185.aspx.

* cited by examiner

*Primary Examiner* — Hilina K Demeter
(74) *Attorney, Agent, or Firm* — Jones Robb PLLC

(57) ABSTRACT

A method and system for notifying a user are provided. The user prints a document at a printer and registers to have the electronic version of the printed document tracked for changes. The electronic version of the printed document is monitored for changes and in case of an alteration, a notification is sent to the user on the basis of his/her preferences.

19 Claims, 3 Drawing Sheets

METHOD AND SYSTEM FOR AUTOMATED HARDCOPY CHANGE NOTIFICATION

COPYRIGHT NOTICE

A portion of the disclosure of this patent document contains material that is subject to copyright protection. The copyright owner has no objection to facsimile reproduction of any one of the patent documents, or the patent disclosure, as it appears in the Patent and Trademark Office patent file or records. Otherwise all copyright rights are reserved.

TECHNICAL FIELD

The presently disclosed embodiments are related to notifying a user about an event. More particularly, the presently disclosed embodiments are related to a technique for notifying a user when changes occur in an electronic version of a document printed by the user.

BACKGROUND

With the advent of networked computing systems, multiple users are able to access a document located on a common server. Various users can make changes to the document apart from the user who created the document. In a networked computing system, various printers are also connected and multiple users can take print-out of documents. However, once printed, users have no way of knowing whether the printed document they have is the most updated document or not. Currently, many mobile print applications have also been launched in the market that enable users to issue print commands for documents without being connected on a computer. This further leads to aggravation of the problem that users may not be aware if the document they have in their hands is the most updated document or not.

SUMMARY

According to embodiments illustrated herein, there is provided a method for notifying a user. The method comprises steps of printing a document at a printer. The printed document corresponds to a first version of an electronic document. Further, any changes made to the first version of the electronic document are monitored and a change notification is sent to the user on the basis of a set of preferences.

According to embodiments illustrated herein, there is provided a system for notifying a user. The system comprises a tracking agent, a change notification database, and a user profile database. The tracking agent is configured for monitoring changes made to a first version of an electronic document and generating change notifications. The change notification database is configured for storing the change notifications received from the tracking agent. The user profile database is configured for storing a user profile pertinent to the user.

According to embodiments illustrated herein, there is provided a computer program product for notifying a user. The computer program product comprises program instruction means for printing a document at a printer, wherein the printed document corresponds to a first version of an electronic document at a first predefined time. Further, the computer program product comprises program instruction means for determining changes made to the first version of the electronic document after the first predefined time. The computer program product subsequently comprises program instruction means for notifying the changes to the user, at a remote location, on the basis of a set of preferences.

BRIEF DESCRIPTION OF DRAWINGS

The accompanying drawings illustrate various embodiments of systems, methods, and embodiments of various other aspects of the invention. Any person having ordinary skills in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
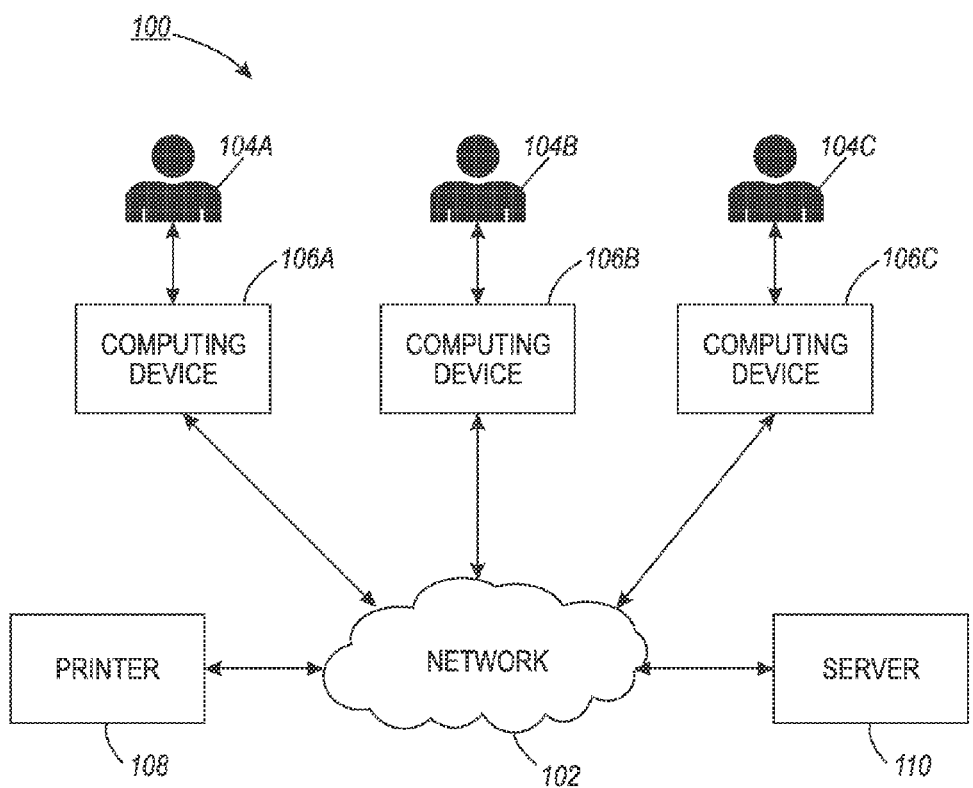
FIG. 1 illustrates an environment in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "multifunction device" (MFD) refers to a device that can perform multiple functions. Examples of the functions include, but are not limited to, printing, scanning, copying, faxing, emailing, and the like.

A "digital image" refers to a collection of data, including image data in any format, retained in an electronic form. The digital image can contain one or more pictorial, symbols, text, line art, blank, or non-printed regions etc. In an embodiment, examples of the digital image include, but are not limited to, various bank account forms, bills, an e-ticket, a hotel reservation form, a boarding pass, student examination papers, various insurance forms, e-statements corresponding to banking, and credit cards. In an embodiment, the digital image is obtained by scanning a corresponding physical document. The digital image can be stored in various file formats, such as, JPG or JPEG, GIF, TIFF, PNG, BMP, RAW, PSD, PSP, PDF, and the like.

A "computing device" refers to a computer, a device including a processor/microcontroller and/or any other electronic component, or a device or a system that performs one or more operations according to one or more programming instructions. Examples of the computing device include, but are not limited to, a desktop computer, a laptop, a personal digital assistant (PDA), a smart-phone, an MFD, a tablet computer (e.g., iPad®, Samsung Galaxy Tab®) and the like. The computing device is capable of accessing (or being accessed over) a network (e.g., using wired or wireless communication capabilities).

A "network" refers to a medium that interconnects various computing devices and server. Examples of the network include, but are not limited to, LAN, WLAN, MAN, WAN, and the Internet. Communication over the network may be performed in accordance with various communication protocols such as Transmission Control Protocol and Internet Protocol (TCP/IP), User Datagram Protocol (UDP), and IEEE 802.11n communication protocols.

"Graphical User Interface" OR "GUI" or "User Interface" or "UI" refers to an interface that facilitates a user to interact with associated computing devices. The user can interact with the GUI using various input mediums/techniques including, but not limited to, a keypad, mouse, joystick, any touch-sensitive medium (e.g., a touch-screen or touch sensitive pad), voice recognition, gestures, video recognition, and so forth. In embodiment, the GUI can be displayed on a touch-screen and the user can interact with the GUI using the touch-screen. In an embodiment, the GUI is a Local User Interface (LUI), i.e., displayable on a local display of an MFD or an image-scanning equipment. In an embodiment, the GUI is a Remote User Interface (RUI), i.e., displayable on a display of any computing device connected to the MFD or the image-scanning equipment. In an embodiment, the GUI is Web User Interface (WUI), i.e., displayable on a web-page.

FIG. 1 illustrates an environment in which various embodiments can be implemented. The environment 100 comprises a network 102, users 104a, 104b, and 104c (hereinafter referred to as users 104), computing devices 106a, 106b, and 106c (hereinafter referred to as computing devices 106), printer 108, and a server 110.

Users 104 communicate with the printer 108 and server 110 through the computing devices 106. The computing devices 106 are in-turn connected to the server 110 and printer 108 through the network 102. The server 110 contains various documents. The users 104 can access these documents through their computing devices 106. Further, users 104 can issue print commands from their respective computing devices 106. The print command is subsequently executed by the printer 108. The detailed process of notifying a user will now be explained in conjunction with the explanation for FIG. 2.

Figure 2:
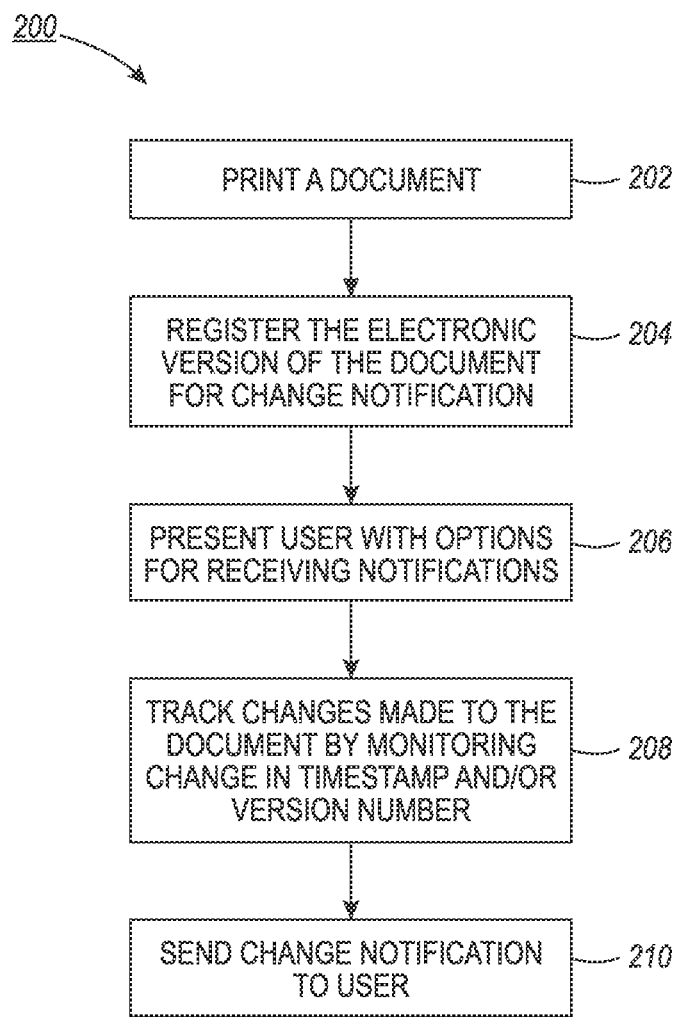
FIG. 2 illustrates a flowchart of a method for notifying a user in accordance with at least one embodiment.

FIG. 2 illustrates a flowchart 200 of a method for notifying a user in accordance with at least one embodiment.

At step 202, one of the users 104 (e.g., the user 104b) issues a print command from his/her computing device 106 to print a document located at the server 110. The printed document corresponds to a first version of an electronic document located at the server 110. In an embodiment, the server 110 is the central server of an organization or a home network. Users 104 can access and work on various documents stored on the server. In an embodiment, users 104 can collaboratively work on a document. Changes made to the document by any of the users 104 can be viewed by other users. In an embodiment, the print command issued by the user 104b is executed by the printer 108. In an embodiment, the printer 108 is a Multi Function Device (MFD). After taking the print-out of the document, the user 104b can register the printed document for tracking any changes and alterations made to the first version of the electronic document corresponding to the printed document. In an embodiment, the user 104b is presented with a user interface (not shown) on the respective computing devices 106b. The user interface presents the user 104b with an option to track the changes made to the document that has been printed. In an embodiment, the user interface is a print driver software with a check-box option for selecting tracking of changes made in the document.

At step 204, the user 104b selects the option of monitoring the electronic version of the printed document for tracking changes made to it by other users on the network 102. It will be understood by a person having ordinary skill in the art that the process of tracking any changes made to the electronic version of the printed document is initiated at a pre-defined time, which corresponds to the time at which the document was printed. Any changes made in the first version of the electronic document post the pre-defined time will be tracked.

At step 206, the user 104b is presented with various options for receiving change notifications. In an embodiment, the user 104b can specify a set of preferences pertaining to the delivery of change notifications to him/her. In an embodiment, various options for receiving the change notification are presented to the user 104b on the user interface. In the options presented, user 104b can specify a time limit for tracking changes made to the printed document. For example, in an embodiment, user 104b can specify that the electronic version of the printed document should be tracked/monitored for changes for a period of one month. In an embodiment, according to the time limit specified by the user 104b, tracking of the electronic version of the printed document will automatically stop after the lapse of a period of one month from the date of registering the printed document.

In an embodiment, the user 104b can specify the frequency with which the change notifications should be delivered to him/her. For example, in an embodiment, the user 104b can specify that the electronic version of the printed document be tracked/monitored for a period of one month and that change notifications should be delivered to him once a week. Thus, changes made to the electronic version of the printed document will be tracked for changes and the user 104b will be notified of the changes once every week.

In an embodiment, the user 104b can specify the medium through which the change notifications should be delivered. The preferred medium of delivery for receiving change notifications can be one or more of, but not limited to, an SMS, an email, a voice message, and/or a social network notification. It will be apparent to a person having ordinary skill in the art that the user 104b can choose one or more of the listed mediums for receiving the change notifications.

In an embodiment, preferences selected by the user 104b for receiving change notifications are stored on the server 110 by creating a user profile. A user profile will be created for each of the users 104 who have registered the electronic version of a printed document for change tracking. It will be apparent to a person having ordinary skill in the art that the users 104, who register to have the electronic version of a printed document monitored for changes may or may not be the author of the printed document.

At step 208, the electronic version of the printed document registered by the user 104b is tracked for changes. In an embodiment, the timestamp or the version number of the electronic version of the printed document is monitored for changes. It will be apparent to a person having ordinary skill in the art that any user of the users 104 can register one or more documents for change monitoring.

The electronic version of the printed document, which has been registered for change monitoring, is continuously monitored by monitoring its timestamp or version number and a change notification is sent to the user 104b whenever a change occurs in the document. If a change takes place in the electronic version of the printed document, the user 104b is sent a change notification on his/her chosen medium at step 210.

In an embodiment, the change notification is sent to the user 104b in the form of a message via any of the medium listed previously. In an embodiment, the message includes the document name, the document's "date modified" time stamp which describes the date and time the file was last modified, the document's version number (if available), the "date printed" time stamp which describes when the document was printed by the user 104b, and the user profile identifier. It would be apparent to a person having ordinary skill in the art that components of the message listed above are only provided as examples, and that other pieces of information can be provided to the user 104 without departing from the scope of the disclosed embodiments. For example, in another embodiment, the user 104b can also be provided with the modified parts of the document. It will be appreciated by a person having ordinary skill in the art that the disclosed embodiments enable a user to ascertain if the hardcopy document that he/she has printed is the latest version or not even while being remote from the location of the electronic version of the printed document. Further, in another embodiment, the user 104b can specify that he/she no longer wishes to receive change notifications. For example, in an embodiment, the user 104b no longer requires the document he/she has printed and does not desire to receive any change notifications regarding changes made to the document. Under such a circumstance, the user 104b can again access his/her preferences on the user interface of his/her computing device 106b and disable change notifications for a particular document.

Figure 3:
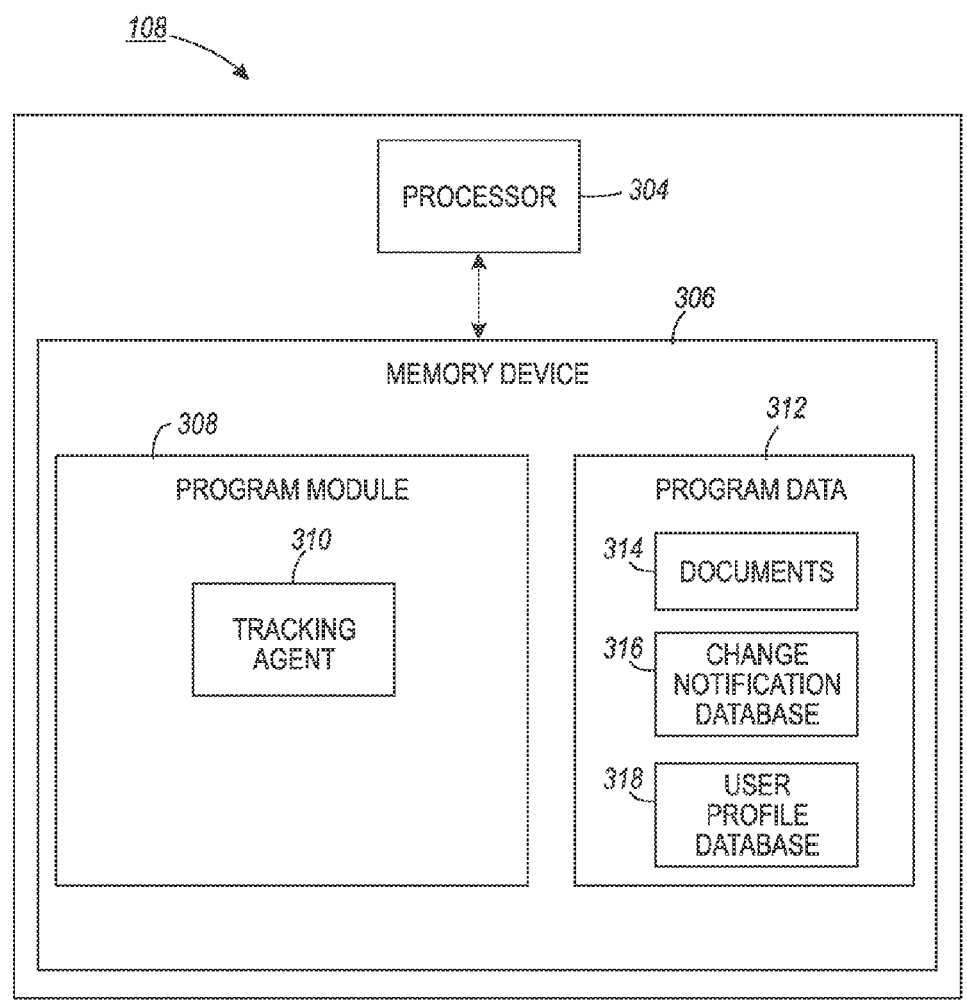
FIG. 3 illustrates a server for notifying changes in accordance with at least one embodiment.

FIG. 3 illustrates a server for notifying changes in accordance with at least one embodiment. Server 108 comprises a processor 304, and a memory device 306. The memory device 306 further comprises a program module 308 and program data 312. Program module 308 comprises a tracking agent 310. Program data 312 further comprises documents 314, change notification database 316, and user profile database 318. It will be apparent to a person having ordinary skill in the art that document 314 stored in program data 312 in an electronic format.

In an embodiment, processor 304 receives an instruction from the user 104b to track changes made to one of the documents stored in the server. Processor 304 executes a set of instructions stored in the memory device 306 to perform one or more operations for tracking changes made to the documents stored on the server. The processor 304 can be realized through a number of processor technologies known in the art. Examples of processor 304 include, but are not limited to, an X86 processor, a RISC processor, an ASIC processor, a CISC processor, or any other processor.

In an embodiment, the user 104b prints a document from the documents 314 stored in program data 312. The user 104b can print the document at the printer 108 using a computing device 106 which is remote from the printer 108. In an embodiment, documents 314 are accessible to multiple users and these multiple users can make changes to documents 314. The user 104b can opt to track the printed document for changes made to it by other users. In an embodiment, the user 104b is presented with an option on a user interface of computing device 106 to track changes made to the document which has been printed. The user 104b can select to have the document tracked for changes and also enter his/her preferences for receiving change notifications. Tracking agent 310 is configured for tracking changes made to the electronic version of the printed document. Tracking agent 310 monitors a change in the current modified timestamp or the version number of the document to be monitored in order to determine if the document has been modified. It will be apparent to a person having ordinary skill in the art that printing a document causes a change in its timestamp. In an embodiment, tracking agent 310 compares the document's timestamp, at which the document was printed, against the document's current "modified" timestamp. If the current "modified" timestamp is later than the "modified" timestamp when the document was printed, then the document has been changed and a change notification will be sent to the user 104b. In another embodiment, tracking agent 310 monitors the version number of the document to be monitored in order to detect if the first electronic version of the printed document has changed. If the current version number is later than the version number when the document was printed, then the document has been changed and a change notification will be sent to the user 104b.

It will be understood by a person having ordinary skill in the art that the techniques for tracking whether the first electronic version of a printed document has changed or not are only provided as examples. Other techniques for monitoring can be employed without departing from the scope of the disclosed embodiments. For example, in an embodiment, the content of the first electronic version of the printed document can be compared with the content of the current electronic version of the printed document, and if a change is detected, then the same can be notified to the user 104b.

While selecting the option for tracking changes made to the electronic version of the printed document, the user 104b is also prompted to enter his preferences for receiving the change notification. Various preferences have been described in conjunction with explanation for FIG. 2. The preferences selected by the user 104b are used to generate a user profile and are stored in the user profile database 318. User profile database 318 contains unique profiles of all users registered with server 108 for receiving change notifications. It will be apparent to a person having ordinary skill in the art that the user 104b may choose one or more documents to be tracked for changes. Additionally, the user 104b may specify different preferences for receiving notifications for different documents. In an embodiment, the user 104b is presented with an option on the user interface of computing device 106, each time the user 104b orders a print command. Preferences defined by any of the users 104 can be stored as one or multiple profiles, pertaining to the same user, in the user profile database 318. It will be apparent to a person having ordinary skill in the art that multiple profiles for the same user can be created by using different document numbers, depending on the document to be monitored. In another embodiment, user 104b prints a document corresponding to a first electronic version. User 104b can then specify multiple recipients who will receive the change notifications when the first electronic version of the document is modified. It will be apparent to a person having ordinary skill in the art that the change notifications sent to multiple users will be in accordance with the preferences set forth by the user 104b. Further, it will be apparent to a person having ordinary skill in the art that the multiple users to whom the change notifications will be sent are registered in the user profile database 318.

Tracking agent 310 monitors the electronic version of the printed document and generates a change notification each time the electronic version of the printed document is altered. In an embodiment, in the event of a change in the electronic version of the printed document, tracking agent 310 sends the change notification to the change notification database 316. In an embodiment, the change notification sent to the change notification database 316 also comprises a document number of the document being tracked. Change notification database 316 accesses user profile information pertaining to the document number from the user profile database 318. The user profile stored at the user profile database 318 comprises information pertaining to user preferences for receiving the change notification. Change notification database 316 uses the information from the user profile database to send the change notification to the user 104b in accordance with the preference selected by the user 104b. The detailed process for tracking changes made to the electronic version of the printed document has been discussed in detail in conjunction with the explanation for FIG. 2.

The server 108 disclosed in the discussed embodiments is located in a network 102 and is connected to the printer 108 and computing devices 106. However, it will be apparent to a person having ordinary skill in the art that a cloud-based server can be implemented without departing from the scope of the disclosed embodiments.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The method and systems described can also be implemented using only software programming or hardware or by a varying combination of the two techniques. The disclosure is independent of the programming language and the operating system used in the computers. The instructions for the disclosure can be written in all programming languages including, but not limited to, 'C', 'C++', 'Visual C++', and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product, as described above, have numerous advantages. Some of these advantages may include, but are not limited to, receiving change notifications while being at a remote location, ensuring that the printed document is the latest version, and receiving notifications in accordance with defined preferences.

Various embodiments of the GUIs, methods, and systems for facilitating modifications in the text colors in digital images have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above-disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and are not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for notifying a user, the method comprising:
printing an electronic document, stored on a server, at a first time, wherein the first time corresponds to a first timestamp that indicates when the electronic document was printed;
monitoring changes made to the electronic document on the server after the first time such that a second timestamp that indicates when the electronic document was last modified is monitored; and
transmitting a notification comprising modified parts of the electronic document to the user, at a remote location, based on a set of preferences when the monitored second timestamp is determined to be after the first timestamp.

2. The method of claim 1 further comprising presenting the user with an option to have the electronic document monitored for the changes made on the server.

3. The method of claim 2 further comprising receiving an instruction from the user to monitor the changes made to the electronic document on the server.

4. The method of claim 1, wherein the set of preferences comprises a time limit for monitoring the electronic document and a frequency of receiving notifications.

5. The method of claim 1 further comprising specifying a medium for receiving notifications.

6. The method of claim 5, wherein the medium for receiving notifications corresponds to one or more of an SMS, an email, a social network notification, or a voice message.

7. The method of claim 1 further comprising registering a unique identification of the user.

8. The method of claim 1, wherein the monitoring further comprises monitoring a version number of the electronic document on the server.

9. The method of claim 8 further comprising monitoring the changes made to a content of the electronic document on the server.

10. The method of claim 1, wherein the user is remote from a source of the electronic document.

11. The method of claim 1, wherein the user can choose to disable receiving notifications for the electronic document.

12. The method of claim 1, wherein the user can select multiple recipients for receiving notifications corresponding to the changes made to the electronic document on the server.

13. A system for notifying a user, the system comprising:
a tracking agent configured for:
monitoring changes made to an electronic document on a server after a first time, corresponding to a first timestamp that indicates when the electronic document was printed, the monitoring including monitoring a second timestamp that indicates when the electronic document was last modified; and
generating change notifications based on the monitoring and a set of preferences when the monitored second timestamp is determined to be after the first timestamp, wherein generating change notifications further comprises transmitting modified parts of the electronic document to the user; and
a change notification database configured for storing the change notifications received from the tracking agent.

14. The system of claim 13 further comprising a user profile database configured for storing a user profile pertinent to the user, wherein the user profile comprises a preferred medium of delivery of the change notifications and a document number of the electronic document to be tracked.

15. A computer program product for use with a computer, the computer program product comprising a non-transitory computer readable medium, the non-transitory computer readable medium storing a computer program code for notifying a user, the computer program code is executable by one or more processors in the computing device to:
print an electronic document, stored on a server, at a first time, wherein the first time corresponds to a first timestamp that indicates when the electronic document was printed;
monitor changes made to the electronic document on the server after the first time such that a second timestamp that indicates when the electronic document was last modified is monitored; and
transmit a notification comprising modified parts of the electronic document to the user, at a remote location, based on a set of preferences when the monitored second timestamp is determined to be after the first timestamp.

16. The computer program product of claim 15, wherein the computer program code is further executable by the one or more processors to present the user with an option to have the electronic document monitored for the changes made on the server.

17. The computer program product of claim 16, wherein the computer program code is further executable by the one or more processors to receive an instruction from the user to monitor the changes made to the electronic document on the server.

18. The computer program product of claim 15, wherein the computer program code is further executable by the one or more processors to specify a medium for receiving notifications.

19. The computer program product of claim 15, wherein the computer program code is further executable by the one or more processors to register a unique identification of the user.

* * * * *